United States Patent [19]
Planche et al.

[11] Patent Number: 5,508,112
[45] Date of Patent: Apr. 16, 1996

[54] PROCESS FOR THE PREPARATION OF BITUMEN-POLYMER COMPOSITION

[75] Inventors: Jean-Pascal Planche, Lyons; François Travers, La Talaudière; Annie Zins, Seysseul, all of France

[73] Assignee: Elf France, Courbevoie, France

[21] Appl. No.: 505,371

[22] Filed: Jul. 21, 1995

Related U.S. Application Data

[63] Continuation of Ser. No. 915,028, Jul. 16, 1992, abandoned, which is a continuation of Ser. No. 477,915, May 7, 1990, abandoned.

[30] Foreign Application Priority Data

Sep. 9, 1988 [FR] France .................................... 88 11825

[51] Int. Cl.$^6$ ..................................................... B32B 11/00
[52] U.S. Cl. .............................. 428/489; 524/59; 524/68; 524/393; 524/575
[58] Field of Search .............................. 524/59, 68, 575, 524/393; 428/489

[56] References Cited

U.S. PATENT DOCUMENTS

| | | | |
|---|---|---|---|
| 3,751,389 | 8/1973 | Hotta et al. | 524/59 |
| 3,803,066 | 4/1974 | Petrossi | 524/60 |
| 3,992,340 | 11/1976 | Bonitz | 106/274 |
| 4,129,542 | 12/1978 | Natheson | 524/70 |
| 4,242,246 | 12/1980 | Maldonado et al. | 106/274 |
| 4,554,313 | 11/1985 | Hagenbach et al. | 524/68 |
| 4,576,648 | 3/1986 | Damangeon et al. | 524/59 |

*Primary Examiner*—Mark D. Sweet
*Attorney, Agent, or Firm*—Burgess, Ryan and Wayne

[57] ABSTRACT

A process is provided for the preparation of bitumen-polymer compositions wherein bitumen is mixed at a composition between 100° C. and 230° C. with a block copolymer of styrene and a conjugated diene and a coupling agent containing a sulphur-donor compound for a duration of at least 10 minutes. The coupling agent is comprised of an elementary sulphur vulcanization agent and at least one sulphur-donor vulcanization accelerator from among morpholine disulphide, N,N'-disulphide of caprolactam and thiuram polysulphides.

19 Claims, No Drawings

PROCESS FOR THE PREPARATION OF BITUMEN-POLYMER COMPOSITION

This application is a continuation of application Ser. No. 07/915,028, filed Jul. 16, 1992, now abandoned, which is a continuation of application Ser. No. 477,915, filed May 7, 1990, now abandoned.

The invention concerns a process for the preparation of bitumen-polymer compositions. It also refers to the application of the compositions obtained to the preparation of coatings and in particular of superficial road coatings, coverings or also calking coverings and likewise refers to a mother solution of polymer which can be used for the obtention of said compositions.

It is known to use bituminous compositions as coatings of different surfaces and in particular as superficial road facings provided said compositions possess a certain number of essential mechanical qualities.

In practice these mechanical qualities are assessed by determining by standardized tests a series of mechanical characteristics of which those most used are the following:

softening point expressed in °C. and determined by the Ball and Ring test defined by the standard NFT 66 008, brittleness point or Fraass point expressed in °C. and determined according to the standard IP 80/53, penetration expressed in 1/10 of mm and determined acording to the standard NFT 66 004, rheologic characteristics under traction determined according to the standard NFT 46 002 and including the magnitudes:

constraint at the threshold $\sigma_s$ in bars elongation at the threshold $\epsilon_s$ in % constraint to the rupture $\sigma_r$ in bars elongation at the rupture $\epsilon_r$ in %.

In general, the conventional bitumens do not simultaneously have the combination of qualities required and it has been known for a long time that the addition of various polymers to these conventional bitumens makes it possible favorably to modify the mechanical properties of the latter and to form bitumen-polymer compositions having improved mechanical qualities in comparison to those of bitumens alone.

The polymers apt to be added to bitumens are most often elastomers such as polyisoprene, butylic rubber, polybutene, polyisobutene, ethylene/acetate vinyl copolymers, polymethacrylate, polychloroprene, ethylene/propylene/diene terpolymer (EDPM), polynorbornene, or also statistic or sequenced copolymers of styrene and of a conjugated diene.

Among the polymers added to bitumens, the statistic or sequenced copolymers of styrene and of a conjugated diene, specially of styrene and of butadiene or of styrene and isoprene, are particularly effective since they dissolve very easily in the bitumens and impart to them excellent mechanical and dynamic properties, specially very good viscoelastic properties.

It is also known that the stability of the bitumen-polymer compositions can be improved by chemical coupling of the polymer with the bitumen, this improvement also making it possible to enlarge the field of use of the bitumen-polymer compositions.

Bitumen-polymer compositions for which a statistic or sequenced copolymer of styrene or of a conjugated diene such as butadiene or isoprene is coupled with bitumen can be prepared by using processes described in the citations FR-A-2376188; FR-A-2429241 and FR-A-2528439. In these processes, said copolymer and a source of sulphur are incorporated into the bitumen, operating between 130° C. and 230° C. and under stirring, the mixture thus formed is then maintained under stirring and at a temperature between 130° C. and 230° C. for at least 15 minutes. The source of sulphur consists of chemically non-bonded sulphur (FR-A-2376188 and FR-A-2429241) or of a polysulphide (FR-A-2528439) and the copolymer and the source of sulphur are incorporated into the bitumen either by direct addition of said ingredients to the bitumen (FR-A-2376188 and FR-A-2528439) or by first preparing a mother solution of the copolymer and of the source of sulphur in a hydrocarbonated oil, then adding said mother solution to the bitumen (FR-A-2429241 and FR,A-2528439).

It has now been found that it would be possible substantially further to improve the mechanical characteristics and the stability of the bitumen-polymer compositions for which a sequenced copolymer of styrene and of a conjugated diene, especially butadiene and isoprene, is coupled with bitumen under the action of a coupling agent playing the part of sulphur donor, if said coupling agent contained at least one accelerator of vulcanization directly playing the part of sulphur donor or completing the action of the latter. In particular the static mechanical characteristics specially determined by traction test are improved at low temperature and are preserved to a large extent after simulated aging. This preservation of characteristics constitutes a sign of stability of the quality of the bitumen-polymer compositions which are most often prepared by batch and therefore stored at high temperature for a more or less long period prior to being used.

Therefore the object of the invention is a process for the preparation of bitumen-polymer compositions wherein, at a temperature comprised between 100° C. and 230° C., there is prepared a mixture of bitumen with a sequenced copolymer of styrene and of a conjugated diene used in a quantity of from 0.5 to 15% by weight of bitumen and a coupling agent containing a sulphur-donor compound, and the mixture obtained is kept within said temperature range and under stirring for a duration of at least 10 minutes, said process being characterized in that the coupling agent is selected from among the products M that contain, by weight, from 1% to 100% of a component A consisting of one or more accelerators of vulcanization donors of sulphur and from 99% to 0% of a component B consisting of one or more vulcanization agents selected among the elementary sulphur and the polysulphides of hydrocarbyl and the products N which contain a component C consisting of one or more vulcanization accelerators non-donors of sulphur, and a product M or a product D, said product D consisting of a component B containing at least one hydrocarbyl polysulphide and eventually elementary sulphur, the weight proportion of the component C to the product M or to the product D being from 0.01 to 1, preferably from 0.05 to 0.5 and the products K formed of elementary sulphur and of a component E which consists of a component C in which at least one of the accelerators non-donors of sulphur is selected from the group formed by the benzothiazolesulphenamides, the metallic dithiocarbamates and the thiuram monosulphides, the proportion by weight of the component E to the elementary sulphur bein from 0.1 to 1, preferably from 0.05 to 0.5, said coupling agent being used in a proportion adequate to furnish a quantity of sulphur repesenting, by weight, from 0.5 to 10% and more particularly from 1 to 8% of the copolymer used to produce the bitumen-polymer composition.

In particular the products M from which can be selected the coupling agent contain, by weight, from 10% to 100% of the component A and from 90 to 0% of the component B.

The vulcanization accelerators donors of sulphur which can be used to form the component A of the product M can be selected in particular from the thiuram polysulphide of the general formula

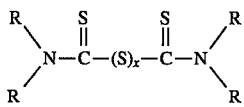

wherein the R's, identical or different, represent each a hydrocarbon radical in $C_1$ to $C_{12}$ and preferably in $C_1$ to $C_8$, especially an alkyl, cycloalkyl, or aryl radical, or two radicals affixed to the same nitrogen atom are interbonded to form a hydrocarbon bivalent radical in $C_2$ to $C_8$ and x is a number going from 2 to 8. As examples of said vulcanization accelerators, there can be especially cited the bisulphide compounds of dipentamethylene thiuram, dipentamethylene tetrasulphide thiuram, dipentamethylene-thiuram hexasulphide, tetrabutylthiuram bisulphide, tetraethylthiuram bisulphide and tetramethylthiuram bisulphide.

As other examples of vulcanization accelerators donors of sulphur which can be used to form the component A of the product M there can also be cited the alkyl phenol disulphides and the disulphides such as morpholine disulphide and N,N'-disulphide of caprolactams.

The vulcanization accelerators non-donors of sulphur which can be used to form the component C of the product N can advantageously be sulphur-containing compounds selected from the benzothiazolesulphenamides and the dithiocarbamates of the general formula (I)

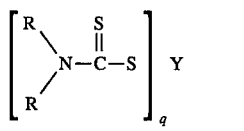

wherein the R's, identical or different, have the meaning given above, Y represents a metal and q designates the valence of Y and the thiuram monosulphides of the general formula (II)

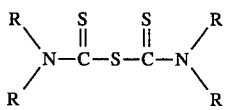

wherein the R's, identical or different, have the meaning given above.

Examples of vulcanization accelerators of the type of benzothiazolesulphenamides can be such as 2-benzothiazole-diethylsulphenamide, 2-benzothiazole-pentamethylenesulphenamide, 2-benzothiazole-cyclohexylsulphenamide, N-oxydiethylene 2-benzothiazolesulphenamide, N-oxydiethylene 2-benzothiazole-thiosulphenamide, 2-benzothiazole-dicyclohexylsulphenamide, 2-benzothiazolediisopropyl sulphenamide, 2-benzothiazoletertiobutyl sulphenamide, N-oxydiethylenethiocarbamyl N'-oxydiethylene sulphenamide.

Among the vulcanization accelerators of the type of dithiocarbamates of the general formula (I), there can be particularly cited the bismuth dimethyldithiocarbamate cadmium diamyldithiocarbamate, cadmium diethyldithiocarbamate, copper dimethyldithiocarbamate, zinc dibutyldithiocarbamate, lead diamyldithiocarbamate, lead dimethyldithiocarbamate, lead pentamethylenedithiocarbamate, selenium dimethyldithiocarbamate, tellurium diethyldithiocarbamate, zinc diamyldithiocarbamate, zinc dibenzyldithiocarbamate, zinc diethyldithiocarbamate and zinc pentamethylenedithiocarbamate.

As examples of thiuram monosulphides corresponding to the general formula (II), there can be cited compounds such as dipentamethylenethiuram monosulphide, tetrabutylthiuram monosulphide, tetraethylthiuram monosulphide and tetramethylthiuram monosulphide.

The above vulcanization accelerators non-donors of sulphur can likewise be those among which are selected the vulcanization accelerator or accelerators of the group of benzothiazole sulphenamides, metallic dithiocarbamates and thiuram monosulphides which are necessarily present in the component E of the product K.

Other vulcanization accelerators non-donors of sulphur which do not belong to the families defined above can likewise be used to form the component C of the product N or eventually can be present in the component E of the product K. Such vulcanization accelerators can be mercaptobenzothiazole, benzothiazolethiolate of a metal such as zinc, sodium, copper, benzothiazyl disulphide, N,N'-diethylthiocarbamyl benzothiazyl sulphide, diphenyl-1,3 guanidine, diorthotolylguanidine and zinc oxide, it being possible to use the later compound eventually in the presence of fatty acids of the type stearic acid, ethylcaproic acid, lauric acid.

Among the different mixtures capable of constituting coupling agents according to the invention, there are preferred those that result in a quick vulcanization and that limit the risk of prevulcanization.

As indicated above, the component B of the coupling agent consists of one or more vulcanization agents selected among elementary sulphur and the hydrocarbyl polysulphides.

The sulphur used is advantageously sulphur in bloom, preferably the orthorhombic crystallized sulphur known by the name of alpha shlphur. In particular, the component B of the product M or the elementary sulphur associated with the component B to form the product K consists of orthorhombic crystallized sulphur.

The hydrocarbyl polysulphides which can be used as vulcanization agents in the component B of the product M or in the product D have the general formula

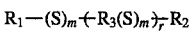

wherein $R_1$ and $R_2$ designate each a saturated or unsaturated monovalent hydrocarbon radical in $C_1$ to $C_{20}$ or are interbonded to constitute a bivalent hydrocarbon radical in $C_2$ to $C_{20}$, saturated or not, forming a cycle with the other groups of atoms associated in the formula, $R_3$ is a saturated or unsaturated bivalent hydrocarbon radical in $C_1$ to $C_{20}$, —$(S)_m$'s represents bivalent groups each one formed of m sulphur atoms, m's can differ from one of said groups to the other and designate integers going from 1 to 6 with at least one of the m's being equal to or more than 2, r represents an integer assuming values from zero to 10.

In the above cited formula., the monovalent hydrocarbon radicals $R_1$ and $R_2$ in $C_1$ to $C_{20}$ and the bivalent hydrocarbon radical $R_3$ in $C_1$ to $C_{20}$ are specially selected among the aliphatic, alicyclic or aromatic radicals. When the radicals $R_1$ and $R_2$ are interbonded to constitute a bivalent hydrocarbon radical in $C_1$ to $C_{20}$ forming a cycle with the other atom groups associated in the formula, said bivalent radical is similar to the radical R and can likewise be of the aliphatic, alicyclic or aromatic type. The radicals $R_1$ and $R_2$ in particular are identical and selected among the alkyl radicals in $C_1$ to $C_{20}$, for example, ethyl, propyl, hexyl, octyl, nonyl, decyl, linear dodecyl, tertio-dodecyl, hexadecyl, octadecyl and the cycloalkyl and aryl radicals in $C_6$ to $C_{20}$, especially benzyl, phenyl, tolyl, cyclohexyl, while the radical $R_3$ or the bivalent radical formed by the union of $R_1$ and $R_2$ are selected among the alkylene radicals in $C_1$ to $C_{20}$ or the cycloalkylene or arylene radicals, especially phenylene, tolylene and cyclohexylene in $C_6$ to $C_{20}$.

Polysulphides that can be used according to the invention are, in particular, those defined by the formula $$R_1-(S)_n-R_2$$

wherein $R_1$ and $R_2$ designate each a monovalent hydrocarbon radical, saturated or unsaturated, in $C_1$ to $C_{20}$, or are interbonded to form a bivalent radical $R_3$ in $C_1$ to $C_{20}$, $R_1$, $R_2$ and $R_3$ have the above meanings,—$(S)_n$—represents a bivalent group formed by a chain of n sulphur atoms, and n being an integer from 2 to 6.

The preferred polysulphides correspond to the general formula $$R_4-(S)_p-R_4$$

wherein $R_4$ designates an alkyl radical in $C_6$ to $C_{16}$ and —$(S)_p$—represents a bivalent group formed by a chain of sulphur atoms, p being an integer from 2 to 5. Examples of such polysulphides are in particular dihexyl bisulphide, dioctyl bisulphide, didodecyl bisulphide, diterdiododecyl bisulphide, dihexadecyl bisulphide, dihexyl trisulphide, dioctyl trisulphide, dinonyl trisulphide, ditertiododecyl trisulphide, dihexadecyl trisulphide, dihexyl tetrasulphide, dioctyl tetrasulphide, diononyl tetrasulphide, ditertiododecyl tetrasulphide, dihexadecyl tetra sulphide, dihexyl pentasulphide, dioctyl pentasulphide, dinonyl pentasulphide, ditertiododecyl pentasulphide and dihexadecyl pentasulphide.

Other polysulphides that can be used according to the invention are, for example, such as diphenyl trisulphide, dibenzyl trisulphide, diphenyl tetrasulphide, orthotolyltetrasulphide, dibenzyl tetrasulphide, dibenzyl pentasulphide, diallyl pentasulphide and tetramethyl-tetrathiane.

Bitumen, which constitutes the major portion of the bitumen-polymer compositions according to the invention, is selected among the different bitumens having a penetration, defined according to the standard NFT 66004, comprised of between 5 and 500, preferably between 20 and 400. Such bitumens can be, in particular, bitumens of direct distillation or of distillation under reduced pressure, or also blown or semi-blown bitumens having a penetration comprised within the above-mentioned ranges.

The copolymer of styrene and of a conjugated diene used in the preparation of the bitumen-polymer composition is advantageously selected among the sequenced copolymers of styrene and butadiene, of styrene and isoprene, of styrene and chloroprene, of styrene and carboxylated butadiene and of styrene and carboxylated isoprene. The copolymer of styrene and of conjugated diene, particularly each one of the above-cited copolymers, has a content by weight of styrene, preferably from about 15% to 40%. The average viscosimetric molecular weight of the copolymer of styrene and of conjugated diene and, in particular, that of the copolymers mentioned above, can advantageously be comprised of between 30,000 and 300,000, preferably between 70,000 and 200,000.

The copolymer of styrene and conjugated diene is selected preferably among the bi- or tri-sequenced copolymers of styrene and butadiene, styrene and isoprene, styrene and carboxylated butadiene, styrene and carboxylated isoprene, having contents of styrene and molecular weights falling within the above-defined ranges.

The preferred amount of copolymer added to the bitumen is comprised of between 0.7 and 10% by weight of the bitumen.

In a preferred embodiment of the process according to the invention, the copolymer and the coupling agent are incorporated in the bitumen in the form of a mother solution of said two products in a solvent consisting of a hydrocarbon oil which has a range of distillation at atmospheric pressure, determined according to the standard ASTM D 86-87, comprised of between 100° C. and 450° C., more particularly, between 150° C. and 370° C.

Said hydrocarbon oil, which can especially be a petroleum fraction of aromatic nature, a petroleum fraction of naphtheno-paraffinic nature, a petroleum fraction of paraffinic nature, a petroleum fraction of naphtheno-aromatic nature, a coal-tar oil, or also an oil of vegetable origin, is "heavy" enough to limit the evaporation at the moment of adding the mother solution to the bitumen and at the same time, "light" enough to be eliminated at the maximum after scattering of the bitumen-polymer composition that contains it, so as to recover the same mechanical properties it would have had after scattering hot the bitumen-polymer composition prepared without making use of the technique of the mother solution.

The mother solution is prepared by putting into contact the ingredients that..compose it, namely, hydrocarbon oil serving as the solvent, the copolymer and coupling agent, under stirring, at temperatures comprised of between 20° and 170° C. and more particularly, between 40° and 120° C. for a sufficient period of time, for example, for about 30 minutes to about 90 minutes, for obtaining a complete dissolution of the copolymer and of the coupling agent in the hydrocarbon oil.

The respective concentrations of the copolymer and of the coupling agent in the mother solution can vary quite widely, especially depending on the nature of the hydrocarbon oil used for dissolving the copolymer and the coupling agent. The respective quantities of copolymer and of the coupling agent can thus advantageously represent from 5% to 40%, and from 0.02 to 15% of the weight of hydrocarbon oil. A preferred mother solution contains, counted by weight of hydrocarbon oil used as the solvent, from 10 to 35% of copolymer and from 0.1 to 5% of coupling agent.

When the compositions, according to the invention, are directly formed from the ingredients of bitumen, copolymer and coupling agent, the work is preferably carried out by first bringing into contact the copolymer with the bitumen in the proportions selected, at a temperature comprised of between 100° C. and 230° C. and while stirring for a sufficient period of time, generally on the order of a few dozen minutes to a few hours, to form a homogeneous mixture, then the coupling agent is added to the mixture obtained, and the whole is kept under stirring at a temperature comprised of between 100° C. and 230° C. corresponding, for example, to the temperature existing when the copolymer is put into contact with the bitumen for a period of time at least equal to 10 minutes and generally from about 10 to 90 minutes to allow the coupling agent to release the radicalaire sulphur and to allow the radicalaire sulphur thus produced to initiate, on one hand, the grafting of the copolymer on the bitumen and, on the other hand, the cross-linking of the chains of said copolymer with each other.

The quantities of copolymer put into contact with the bitumen and of the coupling agent added then to the homogeneous mixture of bitumen and of said copolymers are selected to be comprised within the ranges defined above for these quantities.

For preparing the bitumen-polymer compositions according to the invention by making use of the technique of the mother solution, the mother solution of copolymer and coupling agent is mixed with the bitumen, working at a temperature comprised of between 100° C. and 230° C. under stirring, this being effected, by example, by adding the mother solution to the bitumen kept under stirring at the temperature between 100° C. and 230° C. the resulting mixture is then maintained under stirring at a temperature comprised of between 100° C. and 230° C., for example, at the temperature used for the admixture of the mother solution to the bitumen, for a period at least equal to 10 minutes, and generally from about 10 to 90 minutes, to allow by the expedient of the coupling agent the grafting of the copolymer on the bitumen alphaltenes and the cross-linking with each other of the chains of said copolymer.

The quantity of mother solution admixed to the bitumen is selected for furnishing in relation to the bitumen, the desired quantities of copolymer and of coupling agent, said quantities being within the guides defined above.

A particularly preferred embodiment for the preparation of bitumen-polymer compositions according to the invention by the technique of the mother solution consists of bringing into contact, at a temperature comprised of between 100° C. and 230° C. while stirring, from 80 to 95% by weight of the bitumen with from 20 to 5% by weight of the mother solution, the latter containing by weight hydrocarbon oil serving as a solvent, from 10 to 35% of copolymer of styrene and of conjugated diene and from 0.1 to 5% of coupling agent, then keeping the mixture thus obtained under stirring at a temperature comprised of between 100° C. and 230° C., preferably at the temperature used for bringing into contact the bitumen with the mother solution, for a period at least equal to 10 minutes, and preferably comprised of between 10 and 60 minutes.

The bitumen-polymer compositions obtained by the process according to the invention can be used for making different coatings and in particular, superficial road coatings.

Working at 170° C. while stirring, 1,000 portions by weight of a bitumen of direct distillation having a penetration of 82, a softening point Ball and Ring of 48° C., a Fraas point equal to −18.5° C. and a viscosity at 160° C. of $1.7 \times 10^{-4} m^2/s$ are mixed with 31 portions by weight of a bi-sequenced copolymer of styrene and of butadiene having a viscosimetric average molecular weight equal to about 75,000 and containing 25% by weight of styrene.

A homogeneous mass was obtained after 3 hours and 10 minutes of mixing while stirring.

To this mess kept at 170° C. there was then added 1 portion by weight of crystallized sulphur and the whole continued to be stirred for 60 minutes to form the bitumen-polymer composition.

In Table I, there is given the main characteristics of the bitumen-polymer composition thus obtained before and after being subjected to the aging test called "Rolling Film Oven Test" defined in standard ASTM D 2872. The bitumen-polymer compositions before and after the aging test are respectively designated as "Product Ia1" and "Product Ia2".

Table I likewise gives the corresponding characteristics of the starting bitumen before and after the aging test (respectively "Product Ib1" and "Product Ib2").

Referring to the values given in Table I, it can be seen that the use of a coupling agent constituted by crystallized sulphur results in a bitumen-polymer composition the elastomeric characteristics of which differentiate it clearly from the bitumen (compare the results of the traction test). Besides, the stability with regard to aging of the bitumen-polymer composition is improved in comparison to that observed for the pure bitumen.

TABLE I

| Characteristics Product | PENETRATION at 25° C. (1/10 mm) | Softening POINT B & A (°C.) | Fraas POINT (°C.) | TRACTION TEST | | | | | |
|---|---|---|---|---|---|---|---|---|---|
| | | | | TEMP. (°C.) | SPEED mm/mn | $\sigma_s$ bars | $\sigma_r$ bars | $\epsilon_s$ % | $\epsilon_r$ % |
| I a 1 | 67 | 57 | −19.5 | 20 | 500 | 2.3 | 0.5 | 23 | >900 |
| | | | | 5 | 500 | 20 | 5.6 | 15 | 330 |
| I a 2 | 49 | 59 | −17 | 20 | 500 | 4.4 | 1.8 | 20 | >900 |
| | | | | 5 | 500 | 2.5 | 9.1 | 13 | 180 |
| I b 1 | 82 | 48 | −18.5 | 20 | 500 | 1.2 | 0 | 15 | >900 |
| | | | | 5 | 500 | FRAGILE | | | |
| I b 2 | 51 | 50 | −15 | 5 | 500 | 1.8 | 0 | 15 | >900 |
| | | | | 5 | 500 | FRAGILE | | | |

It is especially for this use that the bitumen-polymer compositions of the invention prepared by the technique of the mother solution are quite particularly adapted, since they can be directly utilized by the classical means of spreading.

The invention is illustrated by the examples that follow, that are not limiting.

The rheologic and mechanical, characteristics of the bitumens or of the bitumen-polymer compositions referred to in these examples are those defined above, namely, penetration, softening point, Fraas point and rheologic characteristics by traction.

EXAMPLE 1

Preparation of a control bitumen-polymer composition by direct incorporation of the copolymer and of the coupling agent into the bitumen.

EXAMPLE 2

Preparation of a bitumen-polymer composition according to the invention by direct incorporation of the copolymer and the coupling agent into the bitumen.

The work is carried out as described in Example 1, but by using by way of coupling agent, a mixture of 0.8 portion by weight of crystallized sulphur and 0.2 portion by weight of a sulphur-donor vulcanization accelerator consisting of tetramethylthiuram bisulphide.

In Table II, there is given for the bitumen-polymer compositions obtained in Examples 1 and 2, characteristics analogous to those appearing in Table I. The same signs symbolize the characteristics corresponding to the bitumen-polymer composition before and after the aging test.

As it appears from the results shown in Table II, the use of a sulphur-donor vulcanization accelerator mixed with the crystallized sulphur to constitute the coupling agent leads to the obtention of a bitumen-polymer composition having elastomeric characteristics substantially improved, especially at low temperatures, compared to those observed for the control bitumen-polymer composition prepared by using a coupling agent consisting only of crystallized sulphur. Besides, the stability with respect to aging of the bitumen-polymer composition according to the invention is clearly improved in comparison to that of the control bitumen-polymer composition.

crystallized sulphur and the reaction temperature was equal to 180° C.

In Example 5, the coupling agent was constituted by a mixture of 0.15 portion by weight of a sulphur-donor vulcanization accelerator consisting of morpholine bisulphide and 0.75 portion by weight of crystallized sulphur, the reaction being conducted at 140° C.

In Example 6, the coupling agent was formed by a mixture of 0.2 portion by weight of two vulcanization accelerators not donors of sulphur, namely, 2-benzothiazole diisopropylsulphenamide and zinc dimethyldithiocarbamate used in equal gravimetric quantities, and 0.8 portion by

TABLE II

| Characteristics Product | PENETRATION at 25° C. (1/10 mm) | Softening POINT B & A (°C.) | Fraas POINT (°C.) | TRACTION TEST ||||||
|---|---|---|---|---|---|---|---|---|---|
| | | | | TEMP. (°C.) | SPEED mm/mn | $\sigma_s$ bars | $\sigma_r$ bars | $\epsilon_s$ % | $\epsilon_r$ % |
| I a 1 | 67 | 57 | −19.5 | 20 | 500 | 2.3 | 0.5 | 23 | >900 |
| | | | | 5 | 500 | 20 | 5.6 | 15 | 330 |
| I a 2 | 49 | 59 | −17 | 20 | 500 | 4.4 | 1.8 | 20 | >900 |
| | | | | 5 | 500 | 25 | 9.1 | 13 | 180 |
| II a 1 | 64 | 56 | −23 | 20 | 500 | 3.1 | 1.3 | 25 | >900 |
| | | | | 5 | 500 | 23 | 9.5 | 22 | >900 |
| II a 2 | 44 | 63 | −18 | 20 | 500 | 3.3 | 1.3 | 20 | >900 |
| | | | | 5 | 500 | 22 | 9.8 | 18 | 550 |

EXAMPLES 3–7

Preparations of bitumen-polymer compositions according to the invention by direct incorporation of the copolymer and of the coupling agent into the bitumen.

The work was carried out as described in Example 2, but with certain variations defined herebelow, the other operating conditions being those of Example 2.

In Example 3, the coupling agent was constituted by a mixture of 0.2 portion by weight of tetramethylthiuram bisulphide and 0.7 portion by weight of crystallized sulphur and the temperature was equal to 160° C.

In Example 4, the coupling agent was formed by a mixture of 0.2 portion by weight of a vulcanization accelerator not donor of sulphur consisting of 2-benzothiazole-dicyclohexylsulphenamide and 0.8 portion by weight of weight of crystallized sulphur, the reaction temperature being kept at 140° C.

In Example 7, the coupling agent was constituted by a mixture of 2 portions by weight of a sulphur-donor vulcanization accelerator consisting of dipentamethylenethiuram tetrasulphide and of 0.6 portion by weight of a vulcanization accelerator not donor of sulphur consisting of zinc oxide, the coupling reaction being carried out at 140° C.

In Table III, there is given the characteristics of the bitumen-polymer compositions thus obtained before and after having been subjected to the aging test.

The bitumen-polymer compositions prior to aging have been designated by "Product P.a.1" while the corresponding bitumen-polymer compositions after aging have been designated by "Product P.a.2", P representing the number of the example in Roman numerals.

TABLE III

| Characteristics Product | PENETRATION at 25° C. (1/10 mm) | Softening POINT B & A (°C.) | Fraas POINT (°C.) | TRACTION TEST ||||||
|---|---|---|---|---|---|---|---|---|---|
| | | | | TEMP. (°C.) | SPEED mm/mn | $\sigma_s$ bars | $\sigma_r$ bars | $\epsilon_s$ % | $\epsilon_r$ % |
| III a 1 | 67 | 58 | −26 | 20 | 500 | 2.1 | 0.7 | 23 | >900 |
| | | | | 5 | 500 | 18 | 6.8 | 22 | >900 |
| III a 2 | 40 | 65 | −19 | 20 | 500 | 4.0 | 2.0 | 29 | >900 |
| | | | | 5 | 500 | 21 | 9.1 | 27 | 340 |
| IV a 1 | 66 | 57 | −23 | 20 | 500 | 2.3 | 0.4 | 18 | >900 |
| | | | | 5 | 500 | 19 | 5.1 | 15 | >900 |
| IV a 2 | 43 | 62 | −18 | 20 | 500 | 4.2 | 1.9 | 28 | >900 |
| | | | | 5 | 500 | 23 | 9.4 | 25 | 380 |
| V.a.1 | 64 | 53 | −20 | 20 | 500 | 2.5 | 0.7 | 25 | >900 |
| | | | | 5 | 500 | 21 | 6.2 | 20 | >900 |
| V.a.2 | 43 | 65 | −18 | 20 | 500 | 4.4 | 1.9 | 29 | >900 |
| | | | | 5 | 500 | 24 | 9.3 | 22 | 220 |
| VI.a.1 | 59 | 56 | −16 | 20 | 500 | 2.6 | 1 | 21 | >900 |
| | | | | 5 | 500 | 22 | 7 | 20 | >900 |
| VI.a.2 | 41 | 63 | −14 | 20 | 500 | 4.5 | 2 | 29 | >900 |
| | | | | 5 | 500 | 30 | 9 | 15 | 210 |
| VII.a.1 | 60 | 57 | −22 | 20 | 500 | 7.7 | 1.3 | 28 | >900 |
| | | | | 5 | 500 | 16 | 4.6 | 23 | >900 |

TABLE III-continued

| Characteristics Product | PENETRATION at 25° C. (1/10 mm) | Softening POINT B & A (°C.) | Fraas POINT (°C.) | TRACTION TEST ||||||
|---|---|---|---|---|---|---|---|---|---|
| | | | | TEMP. (°C.) | SPEED mm/mn | $\sigma_s$ bars | $\sigma_r$ bars | $\epsilon_s$ % | $\epsilon_r$ % |
| VII.a.2 | 42 | 64 | −17 | 20 | 500 | 4.7 | 1.5 | 26 | >900 |
| | | | | 5 | 500 | 23 | 9.9 | 25 | 410 |

EXAMPLE 8

Preparation of a control bitumen-polymer composition by the method of the mother solution.

(a) Preparation of the Mother Solution:

The work was carried out in a stainless steel reactor provided with a stirrer and with a double jacket capable of being trasversed by a heat-conducting fluid.

The hydrocarbon oil used as the solvent to form the mother solution was a petroleum fraction of naphtheno/aromatic nature having the following characteristics:

initial distillation point ASTM equal to 176° C.

final distillation point ASTM equal to 352° C. (measured according to the standard ASTM D 86–67)

flashing point (Luchaire standard NF T 60103) of 79° C.

volume weight (standard ASTM D 1657–64) equal to 0.956

In the reactor, there was introduced 233 parts by weight of the petroleum fraction, which was heated while stirring, to a temperature of about 100° C. by circulating a hot fluid in the double jacket of the reactor.

While maintaining said temperature and stirring, there was then introduced in the reactor, 2 portions by weight of crystallized sulphur and 54 portions by weight of a powder, made anti-caking by 2% by weight of silica, of a di-sequenced copolymer of styrene and of butadiene containing, by weight, 25% styrene and having a viscosimetric average molecular weight of about 75,000.

After stirring for one hour at a temperature of about 100° C. there was obtained a homogeneous and fluid solution at ordinary temperature characterized by the values of kinematic viscosity that follow:

kinematic viscosity measured at 50° C. : $12.10 \times 10^{-4}$ m$^2$/s kinematic viscosity measured at 100° C.: $2.92 \times 10^{-4}$ m$^2$/s This solution constituted the mother solution for the preparation of the bitumen-polymer composition.

(b) Preparation of the Bitumen-Polymer Composition:

In a vat equipped with stirrers and provided with steam heaters, there were pumped at 170° C. 1,700 portions of a bitumen of direct distillation having the initial physical properties:

softening point (Test B & A) : 48° C.

Fraass point: −18.5° C.

penetration: 82 1/10 mm kinematic viscosity at 160° C. : $1.70 \times 10^{-4}$ m$^2$/s To the contents of the vat, kept at 170° C. under stirring, there was then added 300 portions of the mother solution prepared as described above.

After 30 minutes stirring at the temperature of 170° C., there was obtained a fluid bitumen-polymer composition having at 160° C., a dynamic viscosity equal to 0.098 Pa.s., that is to say, a viscosity comparable to that of a bitumen having a penetration within the range of 180–220 and capable of being directly charged in a classical scatterer of medium pressure.

In Table IV, there is given the properties of the bitumen-polymer composition thus obtained before and after being subjected to a thermal treatment consisting of bringing to 160° C. in an oven, an airtight metal vessel containing the bitumen-polymer composition and in maintaining said vessel at said temperature for 60 days, this test allowing to simulate the evolution of the product during a long period of storage. The bitumen-polymer composition is designated by "Product VIII.a.1" prior to thermal treatment and by "Product VIII.a.2" after thermal treatment.

Table IV likewise shows by way of comparison before and after said thermal treatment the corresponding characteristics of the starting bitumen, liquified by 12% by weight, in relation to the bitumen, of the solvent used for constituting the mother solution ("Product VIII.b.1" and "Product VIII.b.2", respectively) and of a bitumen-polymer composition prepared in a manner similar to the one described in Example 8, but omitting the crystallized sulphur ("Product VIII.c.1" and "Product VIII.c.2").

In the designation of the product, the "1"s and "2"s define the bitumen-polymer compositions respectively before and after the thermal treatment.

TABLE IV

| Characteristics Product | Viscosity (Rheomat) at 160° C. (Poise) | Pseudo Viscosity (s) | TRACTION TEST |||||
|---|---|---|---|---|---|---|---|
| | | | TEMP. (°C.) | SPEED mm/mn | $\sigma_s$ bars | $\sigma_r$ bars | $\epsilon_s$ % | $\epsilon_r$ % |
| VIII a 1 | 1.01 | 100 | −10 | 500 | 5,6 | 1,6 | 15 | >900 |
| VIII a 2 | 1.2 | 114 | −10 | 500 | 4,1 | 2,6 | 20 | >900 |
| VIII b 1 | 0.7 | 60 | −10 | 500 | FRAGILE ||||
| VIII b 2 | 0.85 | 80 | −10 | 500 | FRAGILE ||||
| VIII.C.1 | 0.81 | 84 | −10 | 500 | 6.3 | 0 | 15 | 300 |
| VIII.C.2 | 0.97 | 96 | −10 | 500 | FRAGILE ||||

As it appears from the comparison of the results shown on Table IV, the use of crystallized sulphur as the coupling agent in the method that uses the mother solution leads to the obtention of a liquified bitumen-polymer composition having elastomeric characteristics. After storage at elevated temperature, the product gives a residual binder having properties approximate to those of the bitumen-polymer composition prior to the thermal treatment.

EXAMPLE 9

Preparation of the bitumen-polymer composition according to the invention by the method of the mother solution.

The work is carried out as described in Example 8, but forming the mother solution from 243.6 portions by weight of the petroleum fraction, 54 portions by weight of the di-sequenced copolymer of styrene and butadiene and of a coupling agent constituted by 0.4 portion by weight of a sulphur-donor vulcanization accelerator consisting of tetramethylthiuram bisulphide and of 1.5 portions by weight of crystallized sulphur.

In Table V, there is given for the bitumen-polymer composition obtained, characteristics analogous to those given in Table IV for the control composition of Example 8, Table V, likewise, including the characteristics of the control composition to simplify the comparison.

The examination of the results given in Table V make evident that the use of a coupling agent according to the invention in the method of preparation of bitumen-polymer composition that makes use of the mother solution leads to the obtention of a bitumen-polymer composition having elastomeric characteristics clearly improved, in particular, the resistance to rupture $\nabla r$, in comparison to those of the control bitumen-polymer composition for the preparation of which (Example 8) only crystallized sulphur was used as the coupling agent.

EXAMPLES 10 and 11

Preparations of bitumen-polymer compositions according to the invention by the method of the mother solution.

The work is carried out as described in Example 9, but with certain variations defined below, the other conditions of operation being the same as those of Example 9.

In Example 10, the vulcanization accelerator present in the coupling agent consisted of zinc dimethyldithiocarbamate, a vulcanization accelerator that is not sulphur donor.

In Example 11, the vulcanization accelerator present in the coupling agent consisted of tetramethylthiuram monosulphide, a vulcanization accelerator that is not sulphur donor.

In Table VI, there is given the characteristics of the bitumen-polymer compositions obtained before and after having been subjected to the test of thermal storage defined in Example 8.

The bitumen-polymer compositions are designated, before and after storage, by signs comparable to those used in the preceding examples.

TABLE V

| Characteristics Product | Viscosity (Rheomat) at 160° C. (Poise) | Pseudo Viscosity (s) | TRACTION TEST | | | | | |
|---|---|---|---|---|---|---|---|---|
| | | | TEMP. (°C.) | SPEED mm/mn | $\sigma_s$ bars | $\sigma_r$ bars | $\epsilon_s$ % | $\epsilon_r$ % |
| VIII a 1 | 1.01 | 100 | −10 | 500 | 4.6 | 1,6 | 15 | >900 |
| VIII a 2 | 1.20 | 114 | −10 | 500 | 4.1 | 2.6 | 20 | >900 |
| IX.a.1 | 1.21 | 116 | −10 | 500 | 4.6 | 2.5 | 17 | >900 |
| IX.a.2 | 1.30 | 125 | −10 | 500 | 5.2 | 3.4 | 22 | >900 |

Besides the stability during storage at elevated temperatures, for example, at 160° C. for 2 months, of the bitumen-polymer composition according to the invention (Example

TABLE VI

| Characteristics Product | Viscosity (Rheomat) at 160° C. (Poise) | Pseudo Viscosity (s) | TRACTION TEST | | | | | |
|---|---|---|---|---|---|---|---|---|
| | | | TEMP. (°C.) | SPEED mm/mn | $\sigma_s$ bars | $\sigma_r$ bars | $\epsilon_s$ % | $\epsilon_r$ % |
| X.a.1 | 1.20 | 112 | −10 | 500 | 5.7 | 2.6 | 18 | >900 |
| X a 2 | 1.40 | 131 | −10 | 500 | 5.2 | 3.0 | 23 | >900 |
| XI.a.1 | 1.16 | 110 | −10 | 500 | 6.0 | 2.4 | 16 | >900 |
| XI.a.2 | 1.41 | 132 | −10 | 500 | 5.5 | 3.4 | 21 | >900 |

9) is very improved in comparison to that of the control composition (Example 8), the elastomeric properties of the composition according to the invention thus stored (Product IX.a.2) being as good as those of the freshly prepared composition (Product IX.a.1).

What is claimed is:

1. A process for the preparation of bitumen-polymer compositions wherein, at a temperature comprised between 100° C. and 230° C., bitumen is mixed with a block copolymer of styrene and of a conjugated diene selected from the group consisting of butadiene, isoprene, chloroprene, carboxylated butadiene and carboxylated isoprene, said block copolymer being used in a quantity comprised between 0.7% and 10% by weight of bitumen, and with a coupling agent M containing a sulphur-donor compound, and the mixture is kept within said temperature range and under stirring for a duration of at least ten minutes, wherein said coupling agent M is comprised of, by weight, from 1% to 100% of a component A consisting of at least one sulphur-donor vulcanization accelerator and from 99% to 0% of a component B consisting of elementary sulphur vulcanizing agent, wherein said coupling agent is used in a proportion to furnish a quantity of sulphur representing, by weight, from 0.5% to 10% of the block copolymer used to produce the bitumen-polymer composition and wherein said at least one sulphur-donor vulcanization accelerator is selected from the group consisting of morpholine disulphide, N,N'-disulphide of caprolactame and the thiuram polysulphides of the formula

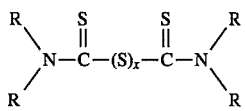

wherein the R's are identical or different and each is a $C_1$–$C_8$ alkyl or two of said R radicals attached to the same nitrogen atom are interbonded to form a $C_2$–$C_8$ bivalent hydrocarbon radical and x is a number from 2 to 6.

2. A process according to claim 1, wherein the coupling agent is used in a proportion adequate to furnish a quantity of sulphur representing, by weight, from 1 to 8% of the copolymer used to produce the bitumen-polymer composition.

3. A process according to claim 1 wherein the coupling agent contains by weight, from 10% to 100% of said vulcanization accelerator and from 90% to 0% of said vulcanization agent.

4. A process according to claim 1, wherein the bitumen has a penetration comprised between 20 and 400, said bitumen being more particularly selected among the bitumens of direct distillation or of distillation under reduced pressure and the inflated or semi-inflated bitumens.

5. A process of claim 1 wherein the vulcanizing agent consists essentially of orthorhombic crystallized sulphur.

6. A process of claim 1 wherein the bitumen has a penetration comprised between 5 and 500, said bitumen being selected from the group consisting of bitumens produced by direct distillation, bitumens produced by distillation under reduced pressure, blown bitumens, semi-blown bitumens and mixtures thereof.

7. A process of claim 1 wherein the copolymer has a content of styrene residues of from about 15% to about 40% by weight of the copolymer.

8. A process of claim 1 wherein the copolymer has a median viscosimetric molecular weight of from 30,000 to 300,000.

9. A process of claim 1 wherein the copolymer and the coupling agent are incorporated into the bitumen in the form of a mother solution of the copolymer and the coupling agent in a solvent comprised of a hydrocarbon oil which has a distillation range at atmospheric pressure between 100° C. and 450° C.

10. A process of claim 9 wherein the hydrocarbon oil is selected from the group consisting of aromatic petroleum fraction, naphtheno-paraffinic petroleum fraction, paraffinic petroleum fraction, coal-tar oils and vegetable oils.

11. A process of claim 9 wherein the mother solution is prepared by stirring, adding components at a temperature between 20° C. and 170° C.

12. A process of claim 9 wherein the copolymer comprises from 5% to 40% by weight of the hydrocarbon oil and the coupling agent comprises from about 0.02% to about 15% by weight of the hydrocarbon oil.

13. A process of claim 12 wherein the mother solution contains from about 10% to 35% by weight of copolymer and from 0.1% to 5% by weight of the coupling agent based on the weight of hydrocarbon oil.

14. A process of claim 12 wherein, at a temperature comprised between 100° C. and 230° C. with stirring, from 80% to 95% by weight of bitumen is contacted with from 20% to 5% by weight of the mother solution comprising by weight of the hydrocarbon oil solvent, from 10% to 35% of copolymer of styrene and conjugated diene and from 0.1% to 5% of coupling agent, the mixture is then maintained under stirring at a temperature between 100° C. and 230° C. for at least 10 minutes.

15. A bitumen-polymer product of the process of claim 1.

16. A process of claim 1 wherein the bitumen comprises at least one bitumen selected from the group consisting of direct distillation bitumens, vacuum distillation bitumens, blown bitumens and semi-blown bitumens having a penetration value between 20 and 400.

17. The bitumen-polymer product of claim 15 wherein the block copolymer is comprised of styrene and butadiene.

18. The bitumen-polymer product of claim 15 wherein the block copolymer is comprised of styrene and isoprene.

19. A road having at least a portion, thereof coated with the bitumen-polymer product of claim 15.

* * * * *